Figure 1:
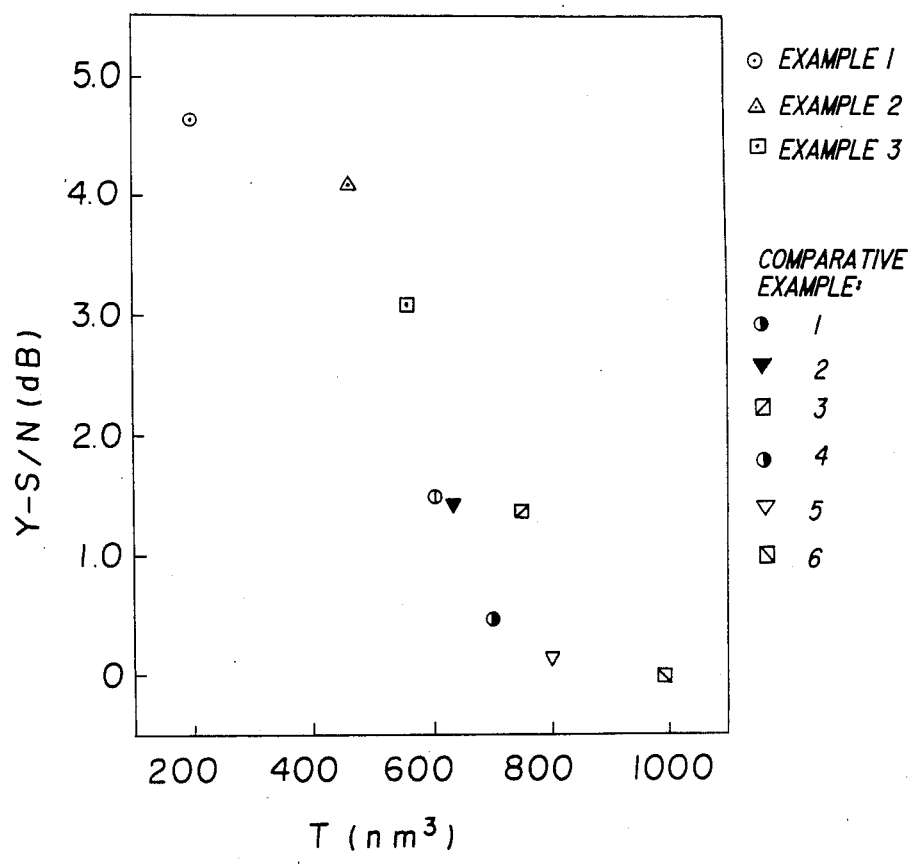

United States Patent [19]

Ohta et al.

[11] Patent Number: 4,650,713
[45] Date of Patent: Mar. 17, 1987

[54] MAGNETIC RECORDING MEDIUM AND PROCESS FOR ITS PRODUCTION

[75] Inventors: Hiroshi Ohta, Komoro; Kinji Sasaki, Hita, both of Japan

[73] Assignee: TDK Corporation, Tokyo, Japan

[21] Appl. No.: 690,521

[22] Filed: Jan. 11, 1985

[30] Foreign Application Priority Data

Jan. 12, 1984 [JP] Japan .................................. 59-2685

[51] Int. Cl.$^4$ ............................................. B32B 15/04
[52] U.S. Cl. ........................................ 428/328; 428/694; 428/900; 427/128
[58] Field of Search ........................ 428/328, 694, 900; 427/128; 252/62.54, 62.56

[56] References Cited

U.S. PATENT DOCUMENTS

| | | | |
|---|---|---|---|
| 4,299,888 | 11/1981 | Pickert et al. | 428/694 X |
| 4,425,400 | 1/1984 | Yamaguchi et al. | 428/694 X |
| 4,425,401 | 1/1984 | Ido et al. | 428/694 X |
| 4,515,857 | 5/1985 | Kitamoto et al. | 428/328 |
| 4,520,069 | 5/1985 | Kitamoto et al. | 428/328 |
| 4,529,649 | 7/1985 | Takeuchi et al. | 428/328 |

*Primary Examiner*—Nancy Swisher
*Attorney, Agent, or Firm*—Oblon, Fisher, Spivak, McClelland & Maier

[57] ABSTRACT

A magnetic recording medium having a magnetic layer comprising ferromagnetic powder particles dispersed in a binder, wherein the ferromagnetic powder particles satisfy the condition represented by $T < 600 \times 10^3$ nm$^3$ where T is an average value of volume $T_1$ of each particle, where $T_1$ is represented by $T_1 = L(nm) \times W(nm) \times W(nm)$ where L is the length of each particle and W is the width thereof, and the skewness in the distribution of the length L is at most 0.4.

2 Claims, 2 Drawing Figures

MAGNETIC RECORDING MEDIUM AND PROCESS FOR ITS PRODUCTION

The present invention relates to a magnetic recording medium and a process for producing it.

Heretofore, magnetic recording media such as magnetic tapes have been prepared by mixing and dispersing in a ball mill a ferromagnetic powder comprising acicular or particulate magnetic iron oxide, additives such as a dispersing agent for the ferromagnetic powder, a lubricant or abrasives to improve the abrasion resistance, a synthetic resin binder, a solvent, etc., coating the mixture on a substrate such as a polyester film, drying it, and then cutting the coated substrate into a tape.

In recent years, magnetic recording media have been desired to be useful for high density recording. Accordingly, it has been desired to improve the S/N ratio or the dispersibility of the ferromagnetic powder or other additives. There have been various proposals for the improvement. However, none of such proposals has been totally satisfactory to provide a magnetic recording medium having adequate properties. In particular, it has been known to employ fine particulate magnetic powder to improve the S/N ratio in the high frequency region. However, it is not easy to prepare fine magnetic powder having good properties.

The present inventors have conducted extensive researches on acicular magnetic powders having various average particle sizes, and have found that the particle size is usually irregular because it is difficult to precisely control the process for the preparation, whereby the dispersion of the particles in the resin binder is impaired, and the S/N ratio can not be improved.

Accordingly, it is an object of the present invention to overcome the above problems and more specifically to provide a magnetic recording medium having a high S/N ratio and being suitable for high density recording.

Namely, the present invention provides a magnetic recording medium having a magnetic layer comprising ferromagnetic powder particles dispersed in a binder, wherein the ferromagnetic powder particles satisfy the condition represented by $T < 600 \times 10^3$ nm$^3$ where $T$ is an average value of volume $T_1$ of each particle, where $T_1$ is represented by $T_1 = L(nm) \times W(nm) \times W(nm)$ where $L$ is the length of each particle and $W$ is the width thereof, and the skewness in the distribution of the length $L$ is at most 0.4.

The present invention also provides a process for producing such a recording medium, which comprises classifying ferromagnetic powder to obtain ferromagnetic powder particles which satisfy the condition represented by $T < 600 \times 10^3$ nm$^3$ where $T$ is an average value of volume $T_1$ of each particle, where $T_1$ is represented by $T_1 = L(nm) \times W(nm) \times W(nm)$ where $L$ is the length of each particle and $W$ is the width thereof and in which the skewness in the distribution of the length $L$ is at most 0.4, dispersing the particles together with predetermined additives in a synthetic resin binder, and coating the dispersion on the surface of a substrate.

It has been found that according to the present invention, it is possible to obtain a superior S/N ratio to a case wherein other magnetic powder having the same average particle size was employed.

Now, the present invention will be described in detail with reference to the preferred embodiments.

Figure 2:
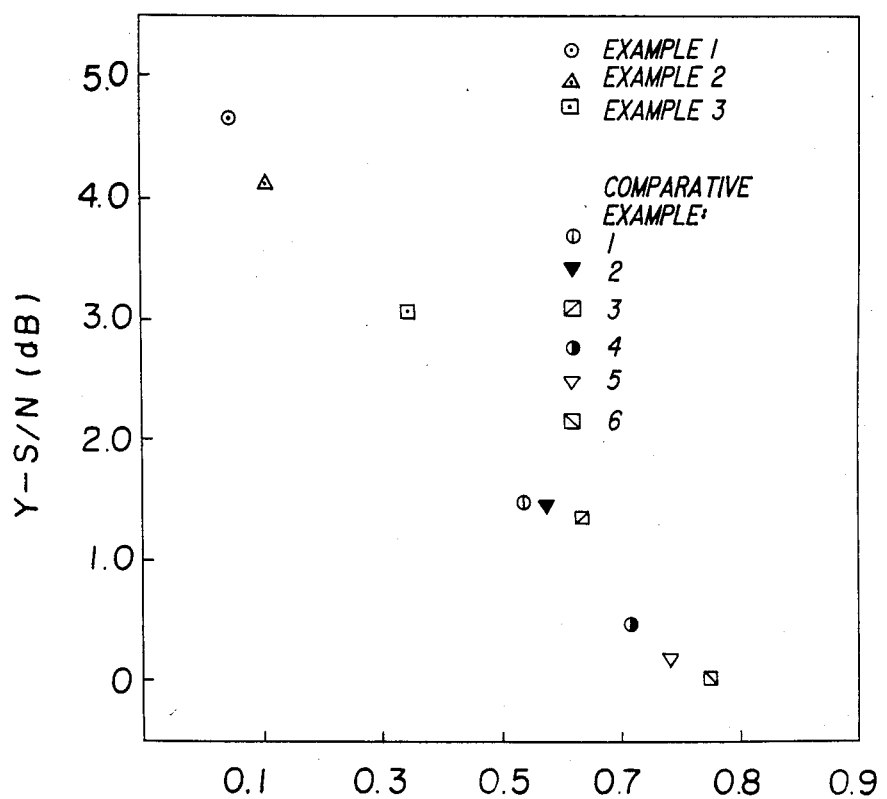

In the accompanying drawings, FIGS. 1 and 2 are graphs showing the electromagnetic properties of magnetic recording media produced by the Examples of the present invention and by the Comparative Examples.

The skewness may be represented by $\Sigma(L-\bar{L})^3/ns^3$ where $L$ is the length of magnetic powder particle, $\bar{L}$ is the average value of the length $L$, and $s$ is a standard deviation.

If the average particle volume $T$ is greater than $600 \times 10^3$ nm$^3$, the S/N ratio tends to decrease. On the other hand, if the skewness is greater than 0.4, the proportion of coarse particles larger than the average particle size increases, whereby the S/N ratio decreases. It is believed that according to the present invention, although the average particle size of the magnetic powder is small, the fine particles and elongate particles are well balanced, whereby the dispersibility in the binder is good, and the S/N ratio is improved. This is an assumption, and the present invention is by no means restricted by this assumption.

The classification of a magnetic powder may be conducted by means of a suitable classifier. Specifically, the starting material is subjected to primary pulverization by means of Pulverizer AP-1 SH Model (manufactured by Hosokawa Micron K.K.), and then the pulverized material is classified by means of a classifier i.e. Super Separator MSS-1 H Model (manufactured by Hosokawa Micron K.K.). Instead of the above-mentioned pulverizer, Micron Jet (manufactured by Hosokawa Micron K.K.) or Super-Sonic Jet Mill PJM-200SC (manufactured by Japan Pneumatic Industries, Co., Ltd.) may be employed. Further, it is possible to employ as a classifier, Dispersion Separator DS-2 Model (manufactured by Japan Pneumatic Industries, Co., Ltd.).

The magnetic powder material to be classified, may be selected from acicular $\gamma$-Fe$_2$O$_3$, acicular Fe$_3$O$_4$, Co-doped or Co-adsorbed acicular $\gamma$-Fe$_2$O$_3$, Co-doped or Co-adsorbed acicular Fe$_3$O$_4$ and acicular alloy magnetic powder.

As the binder, there may be employed any binder composed mainly of a resin, which is commonly employed in this field.

Now, the present invention will be described in further detail with reference to Examples and Comparative Examples. However, it should be understood that the present invention is by no means restricted by these specific Examples.

The following binder composition was employed in the Examples.

| A composition | |
|---|---|
| Vinyl chloride-vinyl acetate copolymer | 20 parts by weight |
| Polyester resin | 13 parts by weight |
| Lubricant | 5 parts by weight |
| Methyl ethyl ketone | 100 parts by weight |
| Methyl isobutyl ketone | 100 parts by weight |
| Cyclohexanone | 100 parts by weight |

EXAMPLE 1

The A composition and 100 parts by weight of Co-doped $\gamma$-Fe$_2$O$_3$ powder obtained as fine particles of ferromagnetic fine powder ($T = 200 \times 10^3$ nm$^3$) by classification treatment, were thoroughly mixed and dispersed in a ball mill to obtain a magnetic coating material. Then, 5 parts by weight of a polyfunctional aromatic isocyanate was added, and the mixture was stirred to obtain a uniform dispersion. Then, the dispersion was coated on a 12 μm polyester base as the substrate so that the dry thickness would be 6 μm. After the surface treatment, the coated substrate was subjected to heat treatment at 60° C. for 48 hours for curing, and then cut into a magnetic tape.

EXAMPLE 2

The A composition and 100 parts by weight of Co-doped γ-Fe$_2$O$_3$ powder obtained as fine particles of ferromagnetic fine powder ($T=461\times10^3 nm^3$) by classification treatment, were thoroughly mixed and dispersed in a ball mill to obtain a magnetic coating material. Then, 5 parts by weight of a polyfunctional aromatic isocyanate was added thereto, and the mixture was stirred to obtain a uniform dispersion. The dispersion was coated on a 12 μm polyester base as the substrate so that the dry thickness would be 6 μm. After the surface treatment, the coated substrate was subjected to heat treatment at 60° C. for 48 hours for curing, and then cut into a magnetic tape.

EXAMPLE 3

The A composition and 100 parts by weight of Co-doped γ-Fe$_2$O$_3$ powder obtained as fine particles of ferromagnetic fine powder ($T=561\times10^3 nm^3$) by classification treatment, were thoroughly mixed and dispersed in a ball mill to obtain a magnetic coating material. Then, 5 parts by weight of a polyfunctional aromatic isocyanate was added thereto, and the mixture was stirred to obtain a uniform dispersion. The dispersion was coated on a 12 μm polyester base as the substrate so that the dry thickness would be 6 μm. After the surface treatment, the coated substrate was subjected to heat treatment at 60° C. for 48 hours for curing, and then cut into a magnetic tape.

COMPARATIVE EXAMPLE 1

The A composition and 100 parts by weight of Co-doped γ-Fe$_2$O$_3$ powder as the starting material ferromagnetic fine powder ($T=604\times10^3 nm^3$), were thoroughly mixed and dispersed in a ball mill. Then, 5 parts by weight of a polyfunctional aromatic isocyanate was added thereto, and the mixture was stirred to obtain a uniform dispersion. The dispersion was coated on a 12 μm polyester base as the substrate so that the dry thickness would be 6 μm. After the surface treatment, the coated substrate was subjected to heat treatment at 60° C. for 48 hours for curing, and then cut into a magnetic tape.

COMPARATIVE EXAMPLE 2

The A composition and 100 parts by weight of Co-doped γ-Fe$_2$O$_3$ powder as the starting material ferromagnetic fine powder ($T=630\times10^3 nm^3$), were thoroughly mixed and dispersed in a ball mill. Then, 5 parts by weight of a polyfunctional aromatic isocyanate was added, and the mixture was stirred to obtain a uniform dispersion. The dispersion was coated on a 12 μm polyester base as the substrate so that the dry thickness would be 6 μm. After the surface treatment, the coated substrate was subjected to heat treatment at 60° C. for 48 hours for curing, and then cut into a magnetic tape.

COMPARATIVE EXAMPLE 3

The A composition and 100 parts by weight of Co-doped γ-Fe$_2$O$_3$ powder as the starting material ferromagnetic fine powder ($T=750\times10^3 nm^3$), were thoroughly mixed and dispersed in a ball mill. Then, 5 parts by weight of a polyfunctional aromatic isocyanate was added thereto, and the mixture was stirred to obtain a uniform dispersion. The dispersion was coated on a 12 μm polyester base as the substrate so that the dry thickness would be 6 μm. After the surface treatment, the coated substrate was subjected to heat treatment at 60° C. for 48 hours for curing, and then cut into a magnetic tape.

COMPARATIVE EXAMPLE 4

The A composition and 100 parts by weight of Co-doped γ-Fe$_2$O$_3$ powder obtained as coarse particles of ferromagnetic fine powder ($T=700\times10^3 nm^3$) by classification treatment, were thoroughly mixed and dispersed in a ball mill to obtain a magnetic coating material. Then, 5 parts by weight of a polyfunctional aromatic isocyanate was added thereto, and the mixture was stirred to obtain a uniform dispersion. The dispersion was coated on a 12 μm polyester base as the substrate so that the dry thickness would be 6 μm. After the surface treatment, the coated substrate was subjected to heat treatment at 60° C. for 48 hours for curing, and then cut into a magnetic tape.

COMPARATIVE EXAMPLE 5

The A composition and 100 parts by weight of Co-doped γ-Fe$_2$O$_3$ powder obtained as coarse particles of ferromagnetic fine powder ($T=803\times10^3 nm^3$) by classification treatment, were thoroughly mixed and dispersed in a ball mill to obtain a magnetic coating material. Then, 5 parts by weight of a polyfunctional aromatic isocyanate was added thereto, and the mixture was stirred to obtain a uniform dispersion. The dispersion was coated on a 12 μm polyester base as the substrate so that the dry thickness would be 6 μm. After the surface treatment, the coated substrate was subjected to heat treatment at 60° C. for 48 hours for curing, and then cut into a magnetic tape.

COMPARATIVE EXAMPLE 6

The A composition and 100 parts by weight of Co-doped γ-Fe$_2$O$_3$ powder obtained as coarse particles of ferromagnetic fine powder ($T=995\times10^3 nm^3$) by classification treatment, were thoroughly mixed and dispersed in a ball mill to obtain a magnetic coating material. Then, 5 parts by weight of a polyfunctional aromatic isocyanate was added thereto, and the mixture was stirred to obtain a uniform dispersion. The dispersion was coated on a 12 μm polyester base as the substrate so that the dry thickness would be 6 μm. After the surface treatment, the coated substrate was subjected to heat treatment at 60° C. for 48 hours for curing, then cut into a magnetic tape.

The electromagnetic conversion characteristics of the respective magnetic tapes were measured and presented in FIGS. 1 and 2.

Comparative Examples 1, 2 and 3 represent the starting materials. The powder of Comparative Example 1 was subjected to classification treatment, and the fine particles of ferromagnetic fine powder thereby obtained were used in Example 1. Ferromagnetic powder obtained as coarse particles was used in Comparative Example 4. Likewise, Comparative Examples 2 and 3 correspond to Examples 2 and 3, or Comparative Examples 5 and 6.

As is evident from FIGS. 1 and 2, Comparative Examples 4, 5 and 6, and Comparative Examples 1, 2 and 3, i.e. the classified coarse ferromagnetic powder, and the starting material ferromagnetic powder, are inferior to Examples 1, 2 and 3 in the electromagnetic conversion characteristics. From the foregoing, it is evident that the magnetic recording media produced by the present invention have excellent electromagnetic characteristics.

We claim:

1. A magnetic recording medium comprising a substrate and a magnetic layer coated thereon said magnetic layer comprising ferromagnetic powder particles dispersed in a binder, wherein the ferromagnetic powder particles satisfy the condition represented by $T < 600 \times 10^3$ nm$^3$ where T is an average value of volume $T_1$ of each particle, where $T_1$ is represented by $T_1 = L(nm) \times W(nm) \times W(nm)$ where L is the length of each particle and W is the width thereof, and the skewness in the distribution of the length L is at most 0.4.

2. A process for producing a magnetic recording medium, which comprises classifying ferromagnetic powder to obtain ferromagnetic powder particles which satisfy the condition represented by $T < 600 \times 10^3$ nm$^3$ where T is an average value of volume $T_1$ of each particle, where $T_1$ is represented by $T_1 = L(nm) \times W(nm) \times W(nm)$ where L is the length of each particle and W is the width thereof and in which the skewness in the distribution of the length L is at most 0.4, dispersing the particles together with predetermined additives in a synthetic resin binder, and coating the dispersion on the surface of a substrate.

* * * * *